United States Patent
Malmberg

[11] Patent Number: 5,735,409
[45] Date of Patent: Apr. 7, 1998

[54] SCREEN CLOTH ELEMENT AND SCREEN CLOTH FOR MAKING THE SAME

[75] Inventor: Mats Anders Malmberg, Trelleborg, Sweden

[73] Assignee: Trellex AB, Trelleborg, Sweden

[21] Appl. No.: 411,416

[22] Filed: Mar. 27, 1995

[30] Foreign Application Priority Data

Oct. 5, 1994 [SE] Sweden ............... 94850172

[51] Int. Cl.⁶ .................................. B07B 1/49
[52] U.S. Cl. ................. 209/399; 209/314; 209/405; 209/408
[58] Field of Search ........................ 209/313, 314, 209/392, 397, 399, 400, 405, 408, 409, 412

[56] References Cited

U.S. PATENT DOCUMENTS

| | | | |
|---|---|---|---|
| 4,141,821 | 2/1979 | Wolff | 209/405 |
| 4,661,245 | 4/1987 | Rutherford et al. | 209/399 |
| 4,909,929 | 3/1990 | Tabor | 209/400 |
| 4,960,510 | 10/1990 | Wolff | 209/405 |
| 5,085,324 | 2/1992 | Dehlen | 209/399 |
| 5,377,846 | 1/1995 | Askew | 209/399 X |
| 5,462,175 | 10/1995 | Bokor | 209/405 X |

FOREIGN PATENT DOCUMENTS

| | | |
|---|---|---|
| 0032436 | 7/1981 | European Pat. Off. . |
| 0 364 541 B1 | 5/1992 | European Pat. Off. . |
| 567361 | 10/1993 | European Pat. Off. ............ 209/399 |
| A-1186311 | 3/1957 | Germany . |
| B-11086311 | 1/1965 | Germany . |
| 8800805 | 3/1908 | Sweden . |
| WO 84/02290 | 6/1984 | WIPO . |

*Primary Examiner*—William E. Terrell
*Assistant Examiner*—Tuan N. Nguyen
*Attorney, Agent, or Firm*—Kinney & Lange, P.A.

[57] ABSTRACT

Detachable screen cloths (14) are fixed on a screen cloth element (11) having a rigid support frame (12, 13) serving as a holder and intended to be fixed in the screen frame (10) of a screening machine. The detachable screen cloths (14) have a rigid screen cloth frame (30, 31) surrounded at least partially by elastomeric material. The rigid mounting frame (12, 13) of the screen cloth element has a guide device (32, 33) which is laterally open for receiving and holding the screen cloth (14). The screen cloth (14) is in sliding engagement with the guide device (32, 33) during the insertion thereof into the guide device. The screen cloth (14) and the guide device (32, 33) have inter engaging surfaces preventing, during the screening operation, relative movements between the screen cloth (14) and the rigid mounting frame (12, 13) of the screen cloth element in directions making an angle with the plane of the screen cloth.

16 Claims, 6 Drawing Sheets

SCREEN CLOTH ELEMENT AND SCREEN CLOTH FOR MAKING THE SAME

FIELD OF INVENTION

The present invention relates to a screen cloth element and a screen cloth for making such a screen cloth element.

BACKGROUND AND DESCRIPTION OF THE PRIOR ART

A very common type of screening machine has a screen frame, in which a number of screen cloth elements are mounted after one another and most often in overlapping relationship to provide agitation of the screening material during the screening operation, using simultaneous vibration of the screen cloth of the screening machine. Generally, the different screen cloth elements are designed with a rigid frame which serves to hold a screen cloth of elastomeric material, or other material, in a tensioned state. The rigid frame sometimes also has crossbars for additionally stiffening the screen cloth. The rigid frame and the optional crossbars are generally integrated in the screen cloth material and sometimes form projecting beams on the underside of the screen cloths. There are different methods for fixing the individual screen cloth elements. In early screen constructions, the screen cloth elements were applied on inwardly projecting flanges on the screen frame of the screening machine and were held depressed against these flanges by clamping strips, most often coated with abrasion-resistant elastomeric material. Subsequently, it has become common practice to fix the screen cloth elements in the screen frame of the screening machine by means of different types of snap-lock means. Examples of this type of constructions are described e.g. in SE-B-422,418 (corresponding to U.S. Pat. No. 4,141,821), U.S. Pat. No. 4,960,510 and WO 84-02290 (corresponding to U.S. Pat. No. 4,661,245).

Another type of snap lock is suggested in DE-A-1,186,311. According to this document, the screen is formed of screen plates of a brittle ceramic material or any other wear-resistant rigid, brittle material. The screen plates are held in place by rubber strips which not only retain the rigid plates by yielding resiliently during mounting while the plates are depressed to their mounting positions, but also serve as elastic dampers to prevent the screen plates, consisting of brittle material, from cracking during the screening operation. When the plates are being depressed, they are pressed downwards almost perpendicularly to their planes, the rubber strips yielding resiliently to make room for the screen plates. This resilient mounting or damping also results in reduced wear, in that the plates yield when subjected to heavy impacts from the screening material.

A further development of the concept of mounting the screen cloth elements by means of snap locks in the screen frame of the screening machine is shown and described in SE-B-460,340 (corresponding to EP-B-0,364,541 and U.S. Pat. No. 5,085,324). In this prior-art screen, the different screen cloth elements are fixed to the screen frame of the screening machine by means of snap-lock means. One part of the snap-lock means is integrally formed with the screen cloth element and is disposed close to one end thereof. The other part of the snap-lock means consists of a thickened portion at the upper edge of a carrier element in the screen frame of the screening machine. The other end of the screen cloth element rests on a projecting abutment surface on the carrier element and is clamped between this abutment surface and a projecting edge portion of the preceding screen cloth element. This last-mentioned type of screen cloth elements and screens has been widely used, since worn screen cloth elements can easily be exchanged for new ones. Moreover, such an exchange can be restricted to those parts of the screening machine which are subjected to the greatest wear.

It has however been found that it would be advantageous, from different aspects, if one could obtain yet greater flexibility in the design of the screen surface and yet greater freedom for exchanging worn screen cloth elements within particularly exposed screen surface portions in screening machines where the screen surface is formed of a number of succeeding screen cloth elements, optionally arranged in cascade manner relative to one another.

One object of the present invention therefore is to meet these requirements. Another object of the invention is to enable an extended time of use for such screen cloth element portions as have not been completely worn down during the screening process, so that these portions can be used several times and only the worn portions of the screen cloth elements are exchanged.

A special object of the invention is to further develop the advantageous screen design with overlapping screen cloth elements which is the subject matter of SE-B-460,340 and its counterparts EP-B-0 364 541 and U.S. Pat. No. 5,085,324.

These and other objects of the invention are achieved by means of screen cloth elements and screen cloths according to the present invention.

SUMMARY OF THE INVENTION

In the invention, use is thus made of detachable screen cloths which are fixed on a screen cloth element having a rigid mounting frame and intended to be fixed in the screen frame of a screening machine. The detachable screen cloths have a rigid screen cloth frame which preferably is at least partially surrounded by elastomeric material. A laterally open guide device in the rigid mounting frame of the screen cloth element is designed for sliding engagement with the screen cloth during the insertion thereof into the guide device and is further designed during screening to prevent relative movements between the screen cloth and the screen cloth elements in directions making an angle with the plane of the screen cloth. For mounting and dismounting the screen cloths, these are inserted laterally in or drawn laterally out of the remainder of the screen cloth elements like a drawer.

By this design of the screen cloth elements and the screen cloths inserted therein, it becomes possible to quickly exchange precisely those portions of the total screen surface which have become worn, and to use the remaining parts for further screening. Moreover, a greater freedom of choice is obtained as regards the size of the screening apertures or screening gaps as well as the choice of material of the exchangeable screen cloths. The invention also makes it possible to optimise the choice of material for the different parts of the screen cloth elements, such that the rigid frame of the screen cloth elements, for example, is integrated in an abrasion-resistant rubber material having properties that are especially well suited for forming the mounting parts of the screen cloth elements, while a different material is selected for the exchangeable screen cloths, so that these are given optimum properties for the intended screening work. It is thus possible to choose a harder elastomeric material for the mounting parts of the screen cloth elements and a softer elastomeric material for the exchangeable screen cloths if a sticky material is to be screened. Besides, it is possible in the same type of mounting parts to use screen cloths of the wire screen type or foraminated ceramic plates. The exchangeable screen cloths can thus be formed from a material having optimum properties for the screening operation, while the rest of the screen cloth element may be formed from a material having optimum properties for the mounting and the retention of the screen cloths.

Another major advantage of the screen cloth elements according to the present invention is that the operator of a particular screening machine is offered a substantial amount of freedom for choosing the screening material in one and the same machine, since he may in a simple manner replace one screen cloth surface with another while maintaining the majority of the screen cloth elements of the screening machine intact. By using exchangeable screen cloths of different types, it is thus possible to screen all sorts of screening materials, from sticky materials to coarse and fine material. The design of the apertures in the screen cloths can therefore be varied irrespective of the remaining parts of the screen cloth elements, and the exchangeable screen cloths may be designed as wire screens or foraminated screens.

Since the invention is particularly advantageous for use in connection with screen cloth elements according to SE-B-460340 and its counterparts U.S. Pat. No. 5,085,324 and EP-B-0364541, it will be described hereinafter by way of an embodiment which is based on this advantageous type of screens. The invention is however usable for all types of screen cloth elements having a rigid frame and a screen cloth retained thereby, and intended to be fixed in the screen frame of a screening machine.

BRIEF DESCRIPTION OF THE DRAWINGS

The invention will be described in more detail hereinbelow with reference to accompanying drawings showing a currently preferred best embodiment of the invention.

DESCRIPTION OF THE PREFERRED EMBODIMENTS

Figure 1:
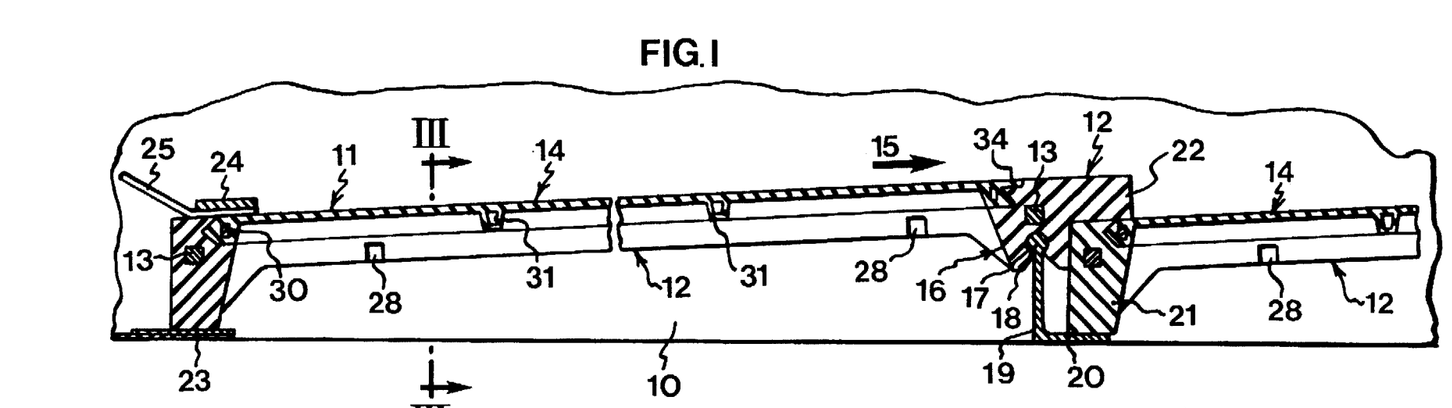
FIG. 1 is a longitudinal section of a part of a screen having screen cloth elements according to the present invention.

As appears from FIG. 1, the screening machine has a screen frame 10, in which a number of screen cloth elements 11 according to the invention are mounted after one another. The screen cloth elements 11 comprise a rigid mounting frame in the form of a mounting part 12 and a rigid reinforcing core 13 provided therein. The reinforcing core 13 is integrated in an abrasion-resistant elastomeric material which may consist of natural or synthetic rubber or plastic. An exchangeable screen cloth 14 is mounted in the mounting part 12 in a manner which will be described in more detail hereinafter.

As appears from FIG. 1, the ends of the successively mounted screen cloth elements are overlapping, so that the downstream end, as seen in the screening direction (arrow 15), of one screen cloth element is positioned on top of the upstream end of the following screen cloth element. The underside of the mounting part 12 adjacent its downstream end has a projection 16 with an undercut groove 17. The components 16 and 17 form one part of snap-lock means for locking the screen cloth element to the screen frame. The other part of the snap-lock means consists of a thickened edge portion 18 on a carrier element 19 included in the screen frame. This carrier element has a projecting flange or abutment surface 20. The upstream end 21 of the following screen cloth element rests on this abutment surface. The relative dimensions of the carrier element, the snap-lock means and the screen cloth elements are such that the upstream end of the following screen cloth element is clamped between the abutment surface 20 and the projecting edge portion 22 of the preceding screen cloth element. By this design, it is possible to reduce the number of snap-lock means required for the same number of screen cloth elements in one screen while simultaneously achieving a stepped screening surface which turns the screening material and thus, improves the screening efficiency. The upstream end of the uppermost screen cloth element rests on an abutment surface 23 on the screen frame 10 and is depressed against this abutment surface by a clamping element 24. The clamping element 24 also retains a sliding surface 25, along which the material to be screened passes down to the screen cloth elements.

Figures 3, 4:
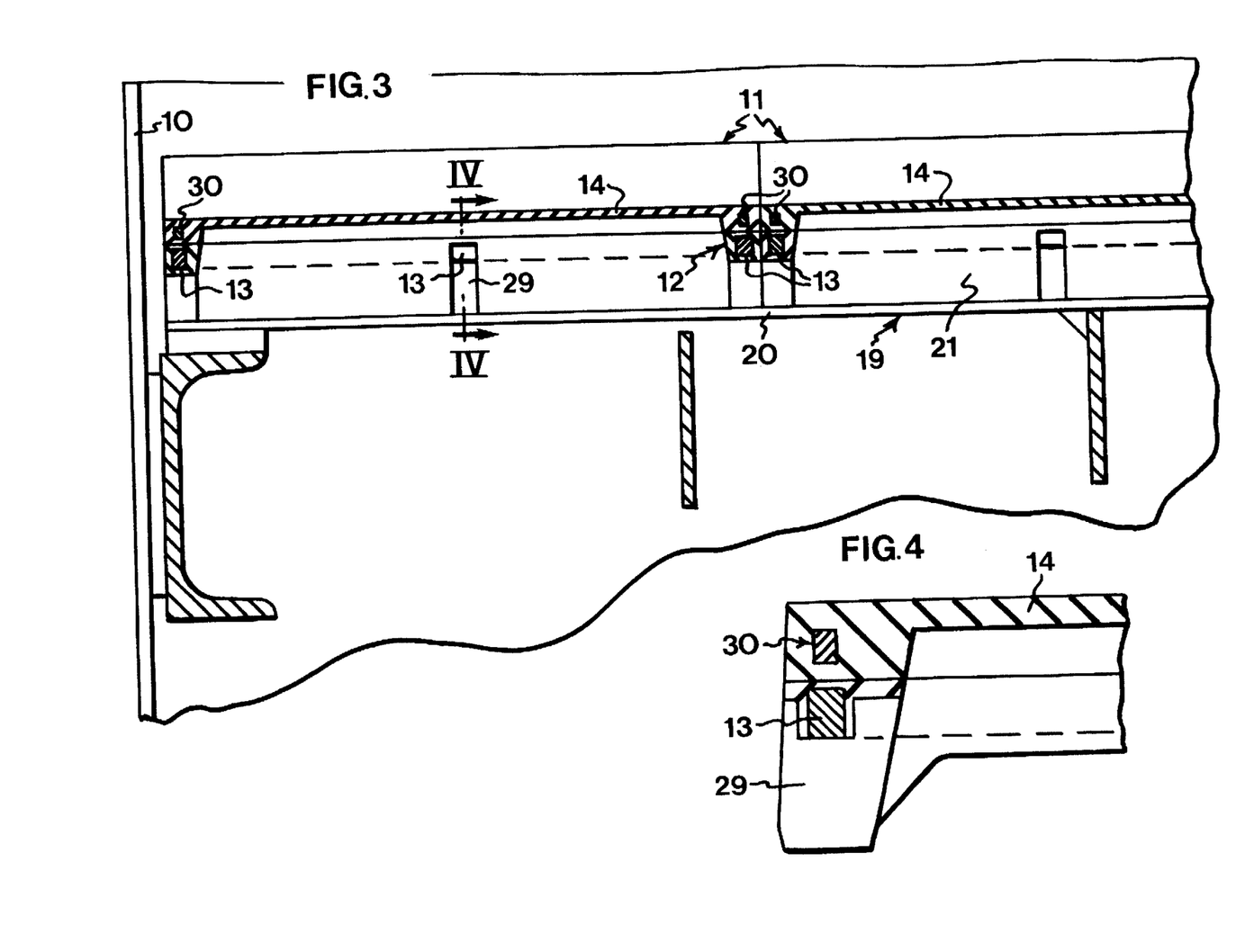
FIG. 3 is a section taken along line III—III in FIG. 1.
FIG. 4 shows part of a section taken along line IV—IV in FIG. 3.
Figure 5:
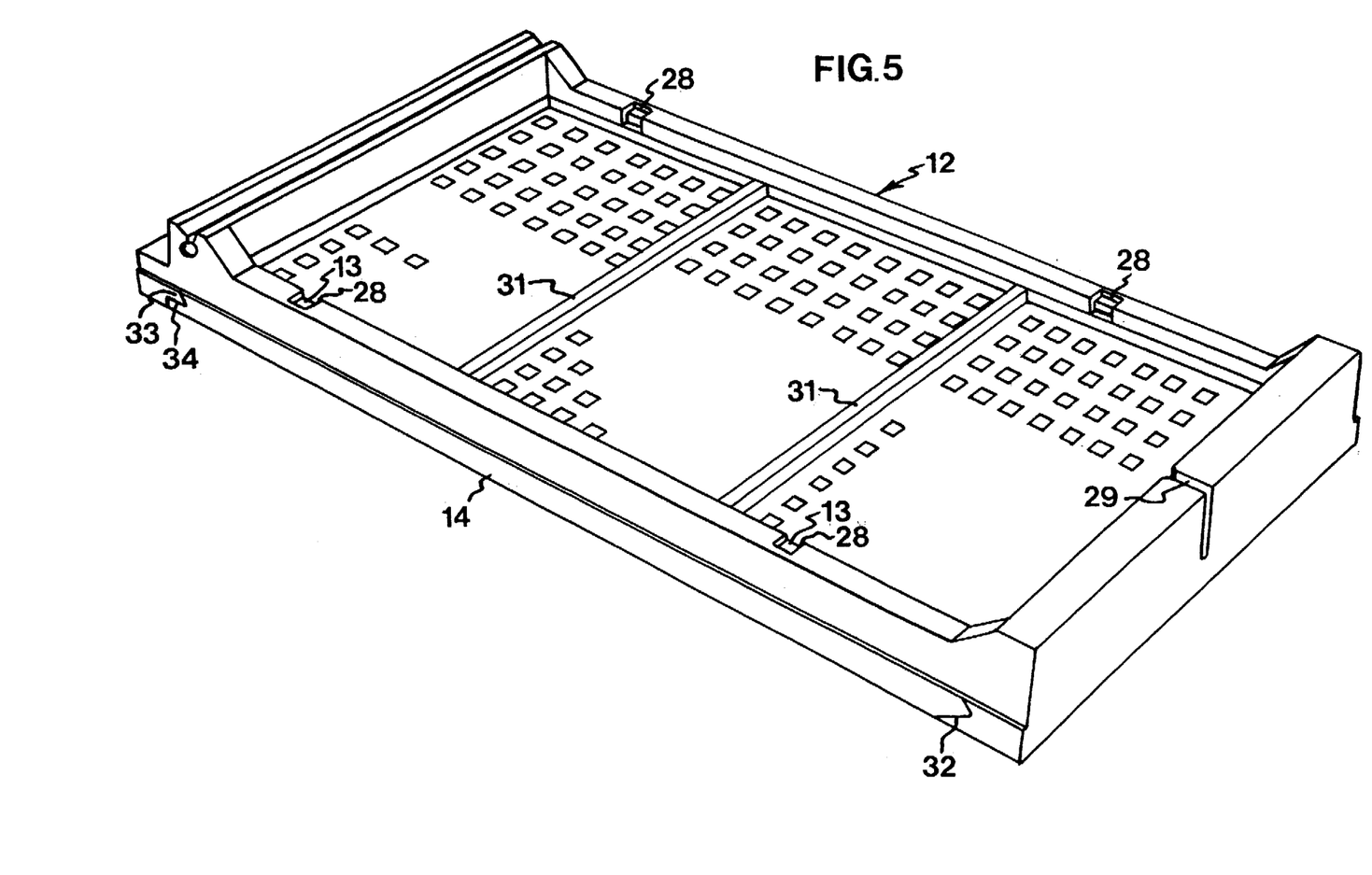
FIG. 5 is a perspective view of a screen cloth element seen obliquely from below.

In the manufacture of the mounting part 12 of the screen cloth element, the frame 13 is placed in a vulcanising mould, such that it will abut on supporting bosses in five places where the vulcanising mould has inwardly extending abutment surfaces forming recesses on the underside of the mounting part or holder 12 to be formed. Four of the recesses 28 are visible in FIG. 5 and are disposed on the inside of the longitudinal edge stiffening means of the holder. The fifth recess is a narrow groove 29 at the upstream end of the holder 12, this recess being illustrated in more detail in FIGS. 3 and 4.

As mentioned above, a screen cloth element according to the invention comprises a holder part or mounting part 12 and a screen cloth 14 insertable therein.

The screen cloth 14, consisting of elastomeric material, has a rigid screen cloth frame 30 which is integrated in the elastomeric material and encircles the screen cloth 14 and which may advantageously have one or more crossbars 31, since the screen cloth element and the screen cloth have a substantial length, as seen in the screening direction (arrow 15). The crossbars 31 serve to stiffen the screen cloth and reduce the tendency of the screen cloth surfaces to flutter when the screen cloth 10 is vibrating. In the use of the invention, the screen cloth 14 is thus formed as a separate element.

For mounting the screen cloth 14 in the mounting part 12 of the screen cloth element, the part 12 has been designed with a guide device 32, 33, which is laterally open relative to the screen cloth element. This guide device is designed for sliding engagement with the screen cloth during the insertion thereof into the holder part 12 and is also designed to prevent relative movements between the screen cloth 14 and the holder part 12 of the screen cloth element in directions making an angle with the plane of the screen cloth, especially at right angles thereto. Since the screen cloths are inserted in the holder part transversely of the screening direction of the screening machine, the screen cloths will be prevented from moving along the guides, once the screen elements have been mounted in the screen frame of the screening machine. Thus, the screen frame prevents movements in the transverse direction.

In the screen cloth element according to the invention, the rigid frame or holder part 12 advantageously comprises a rigid frame core 13 and a coating of elastomeric material partially surrounding the core. Advantageously, the guide device is designed in this coating, as shown in the drawings.

Figure 2:
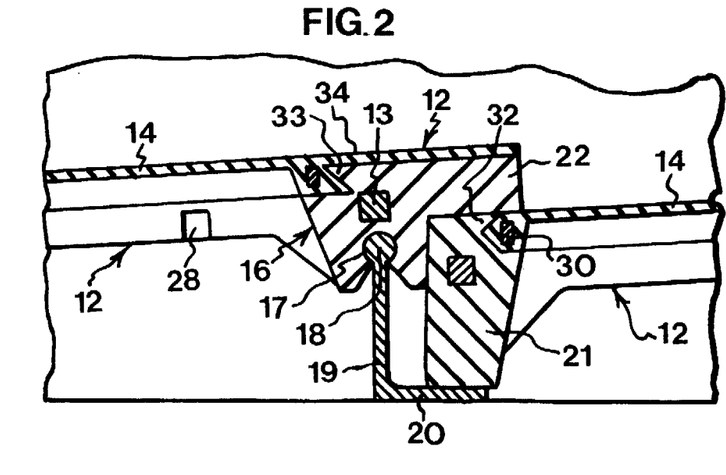
FIG. 2 shows on a larger scale a detail of FIG. 1.

The guides 32, 33 of the guide device are advantageously so located in the holder part 12 of the screen cloth element as to be protected against contact with the screening material. To this end, the guide 32 at the upstream end of the screen cloth element is so positioned that this guide 32 and a portion of the screen cloth 14 are concealed under and protected by the projecting portion 22 of the immediately preceding screen cloth element, as appears from FIGS. 1 and 2. At the downstream end of the screen cloth element, the guide 33 is protected by the screen cloth 14 being designed with a projecting portion 34 which is recessed in the holder part 12 and is flush with the upwardly facing surface of the projecting portion 22 of the holder part. The projecting portion 34 may either end just after the guide 33, as shown in the embodiment according to FIG. 1, or extend as far as the end of the projecting portion 22, as shown in the embodiment of FIG. 2.

Figure 6:
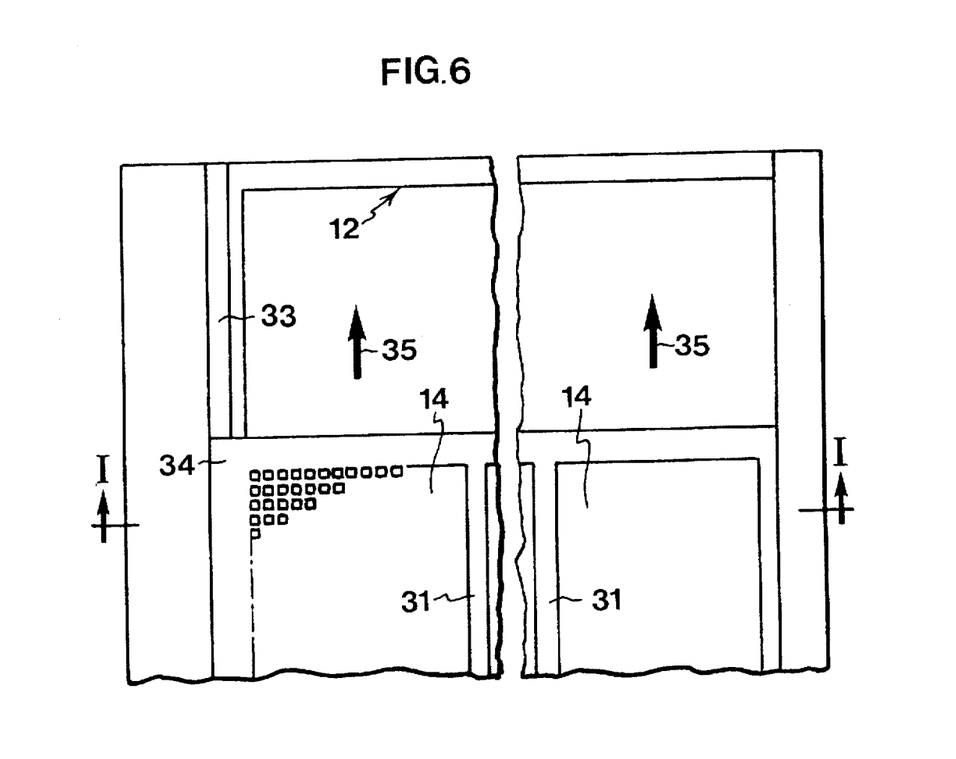
FIG. 6 shows from above a screen cloth element according to FIG. 1 during the mounting of a screen cloth by the insertion thereof in a guide device.

For mounting and dismounting the screen cloths 14, these are laterally inserted in the holder part 12 of the screen cloth elements, as indicated by arrows 35 in FIG. 6. The screen cloths 14 then slide along the guides 32, 33, the insertion and extraction of the screen cloths being facilitated by the position of the rigid frame 30 of the screen cloth in the elastomeric material close to the portion of the screen cloth elastomeric material forming the guide surface which the guides 32, 33 of the holder part 12 engage.

Figures 7, 8:
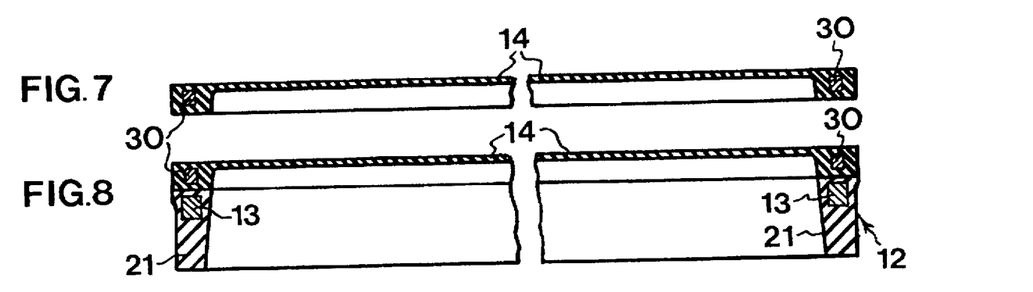
FIG. 7 is a section taken along line III—III through the screen cloth in FIG. 1.
FIG. 8 is a section taken along line III—III through the screen cloth element with a screen cloth according to FIG. 1 mounted thereon.
Figure 9:
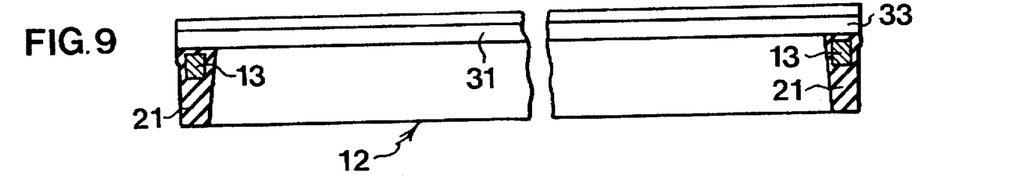
FIG. 9 is a section taken along line III—III through the mounting part of the screen cloth element prior to the mounting of the screen cloth.
Figure 10:
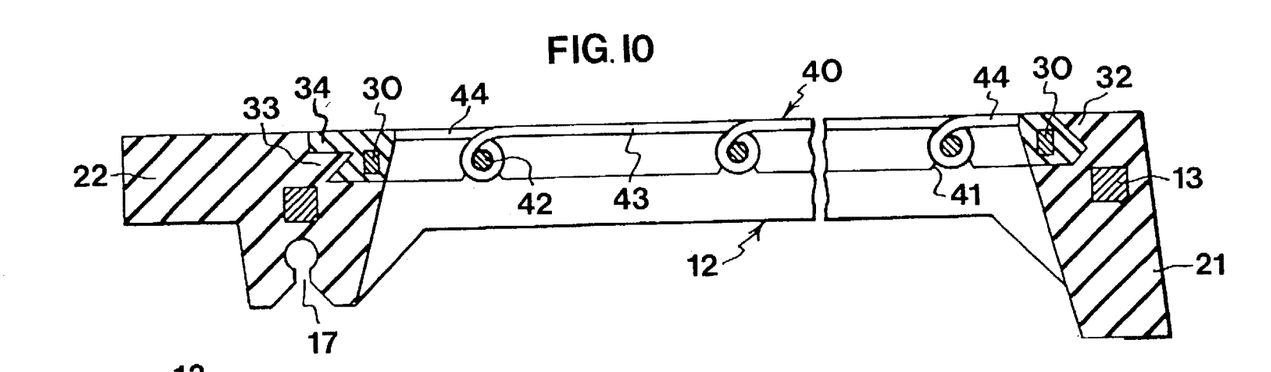
FIG. 10 is a section, similar to FIG. 1, of an individual screen cloth element in a further embodiment according to the invention.
Figure 11:
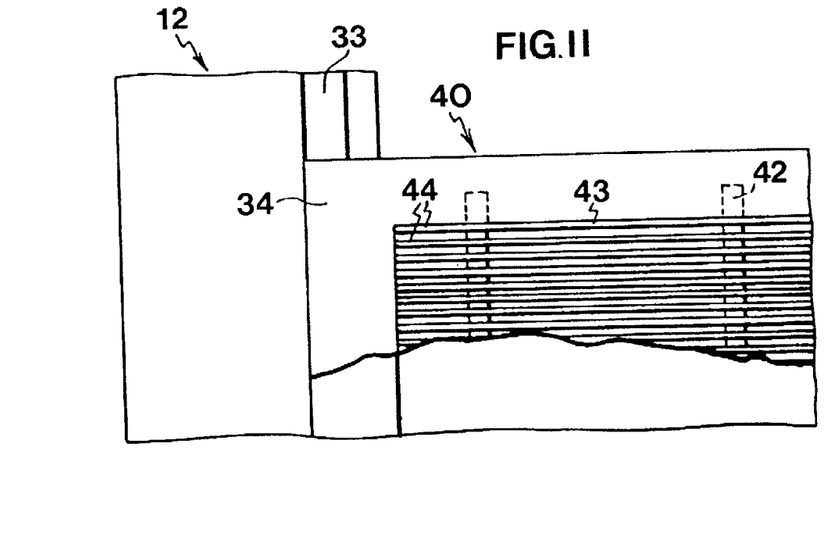
FIG. 11 is a view, similar to FIG. 6, of the screen cloth element according to FIG. 10 during the insertion of a screen cloth into a guide device in the mounting part of the screen cloth element.

As appears from FIG. 8, the rigid frame 30 of the screen cloth 14 is disposed straight above the rigid frame 13 of the holder or mounting part 12 to be supported thereby. By this arrangement, the separate, inserted screen cloth will not as easily be depressed or deflected by the screening material placed thereon.

FIGS. 10–13 show another embodiment of a screen cloth element and a screen cloth according to the present invention. In this case, the screen cloth is designed as a wire screen 40. The wire screen has a rigid frame element 30 of metal which encircles the screen. This screen element is a substantially completely embedded in elastomeric material in the same way as in the case of the screen cloths 14 in the previously described embodiments of the invention. The difference with respect to these embodiments is that undercut grooves 41 are provided in the underside of the elastomeric material on the inside of the frame element 30. The grooves 41 are intended to cooperate with transverse carrier rods 42 of metal. These carrier rods in turn are interconnected by the wires 43 of the wire screen. As appears from FIGS. 10–13, the screen wires 43 are wound one turn about each carrier rod. At the ends of the wire screen, the screen wires extend up to the inside of the elastomeric material surrounding the frame element 30. If so desired, the free ends 44 of the screen wires 43 may extend into downwardly-facing recesses in the elastomeric material.

Figures 12, 13:
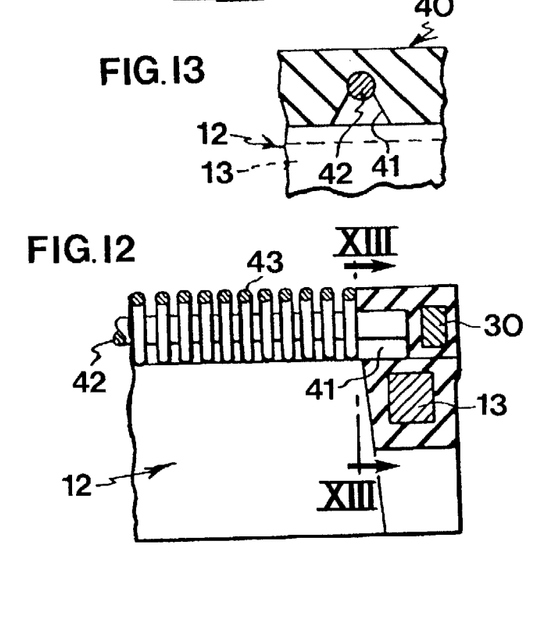
FIG. 12 is a section, similar to FIG. 3, of the screen cloth element according to FIG. 10.
FIG. 13 is a section taken along line XIII—XIII in FIG. 12.

As appears from FIG. 12, the carrier rods 42 will be confined in their undercut grooves 41, once the carrier rods with the screen wires 43 disposed thereon have snapped in place in the grooves 41 and the screen cloth has been laterally inserted in the holder part 12.

If the screen cloth is a wire screen, the screen wire elements need not necessarily be designed as shown in FIGS. 10–13. Thus, the screen wires 43 may instead extend straight from end to end and rest on the carrier rods 42 and be welded thereto. Alternatively, the screen wires 43 may be fixed directly on the frame element 30 on the screen cloth. In such a case, the screen wires 43 may be pretensioned, if so desired.

Figure 14:
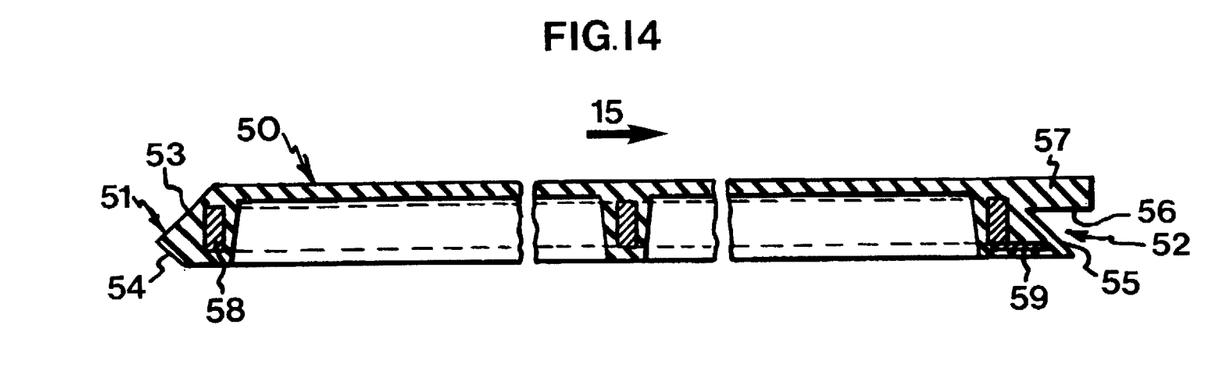
FIG. 14 is a longitudinal section of another embodiment of a screen cloth according to the invention, parts thereof being broken away.

FIG. 14 shows another embodiment of a screen cloth 50 according to the invention. The general shape of the screen cloth is the same as that of the screen cloth 14 in the embodiment shown in FIGS. 1–9. The screen cloth 50 has a guide 51 on its upstream end and a guide 52 at its downstream end. The upstream end guide 51 is gable-roof-shaped in cross-section and comprises an upper guide surface 53 and a lower guide surface 54, the crest of the gable-roof-shaped guide being disposed at a greater distance from the top surface of the screen cloth than from the bottom surface thereof for the reason explained below. The roof surface 53 is inclined at an acute angle to the top surface and extends towards the upstream end of the screen cloth.

The downstream guide surface 52 is shaped as a groove in the downstream end of the screen cloth 50. In the embodiment shown, this groove has its upper wall surface 56 disposed in parallel with the top surface of the screen cloth. The lower wall surface 55 of the groove or guide surface 52 is disposed at an acute angle to the bottom surface of the screen cloth, extending towards the upstream end of the screen cloth. The bottom of the groove is disposed at a greater distance from the bottom surface of the screen cloth than from the top surface thereof for the reason explained below. Further, the screen cloth has a projecting portion 57 corresponding to the projecting portion 34 in the embodiment shown in FIGS. 1–9.

The screen cloth of FIG. 14 has a rigid frame 58 corresponding to the frame 30 in the embodiment shown in FIGS. 1–9. The rigid frame 58 has a flange 59 projecting in the downstream direction and into the coating of abrasion-resistant elastomeric material surrounding the frame or core 58. This flange 59 is either integral with or rigidly attached to the frame 58. The purpose of this flange 59 is to reinforce the tip of the elastomeric material between the groove surface 55 and the bottom surface of the screen cloth in order to improve the function of the guide surface. Thus, this flange makes it easier to slide the screen cloth into the mounting part of the screen cloth element and also decreases the flexibility of the tip, thus improving the retainment of the screen cloth in the mounting part during the use of the screen frame.

Figure 15:
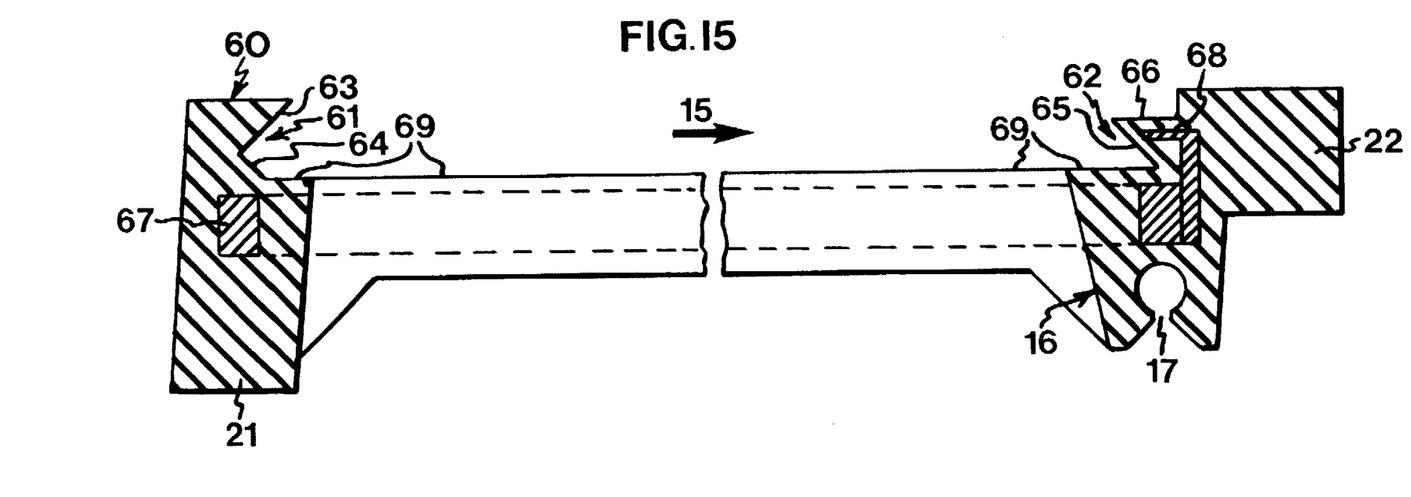
FIG. 15 is a longitudinal section of another embodiment of a rigid mounting frame forming part of a screen cloth element according to the invention, intended to receive a screen cloth having its guide surfaces shaped as those of the screen cloth shown in FIG. 14.

The mounting part 60 of the screen cloth element shown in FIG. 15 has its guide surfaces 61 and 62 at the upstream end and downstream end, respectively, shaped complementary to the guide surfaces 51 and 52, respectively, of the screen cloth 50. Thus, the upstream guide surface 61 is shaped as a groove having a gable-roof-shaped cross-section with an upper wall 63 and a lower wall 64. Further, the mounting part 60 has a support surface 69 for supporting the screen cloth mounted in the mounting part 60. The bottom of the groove 61 is disposed closer to the support surface 69 than to the upper surface of the screen cloth element.

The guide surface 62 on the downstream end of the mounting part is formed as a flange having a substantially triangular cross-section. The lower face 65 of this flange is disposed at an acute angle to the support surface 69 and extends in the upstream direction from the support surface. The upper surface 66 of the flange 62 is parallel to the upper surface of the mounting part 60 or the screen cloth element and is closer to that surface than to the support surface 69.

The mounting part 60 has a rigid core or frame 67 corresponding to the frame 13 of the embodiment shown in FIGS. 1–9. Like the frame 58 of the screen cloth 50, this frame 67 has a flange 68 extending into the tip of the downstream guide surface 62 in order to stiffen this tip and improve the function of this guide surface both in connection with the mounting of the screen cloth 50 in the mounting part 60 and in connection with the use of the screen cloth element in a screening machine.

By forming the guide surfaces 51, 61, 52, 62 as mentioned above and as shown in FIGS. 14 and 15, the wall surfaces 53, 63, 55, 65 are enlarged, compared to an embodiment in which the tips of the guide surface are disposed at equal distances from the top surface of the screen cloth element and the support surface 69 of the mounting part 60. By enlarging the surface area of the guide surfaces 51, 61, 52, 62, these surfaces will be able to withstand greater forces tending to separate the screen cloth 50 from the mounting part 60 in an upward direction during the use of the screen cloth element in a screening machine making use of a vibration mechanism to improve the screening effect.

A considerable advantage of the screen cloth element according to the present invention thus is that the operator of the screening machine can easily exchange the screen cloths in case of excessive wear, or when it is desirable to switch from one type of screen cloth to another.

As mentioned above, the invention confers major advantages, in that only a small part of the screen cloth element is replaced when renovating the screen surface of the screening machine, and in that the holder part 12 of the screen cloth element is reused as a holder for new screen cloths. Another advantage is that stock-keeping is facilitated by the small screen cloth dimensions as compared with the whole screen cloth elements. The reduced dimensions are also advantageous in terms of manufacture, transportation and storage. The exchangeability and the ease with which exchanges can be made are also major advantages, in that it is easy to switch between different types of screening operations in the screening machine, i.e. by a simple exchange it is possible to alter the mesh size or the quality of the material in the very screen cloth surface so as to achieve optimum conditions for a large variety of screening material grades.

As also mentioned above, the invention is particularly advantageous in connection with the type of screens described with reference to the embodiment. The invention can however be advantageously used also for other types of screens made up of a number of screen cloth elements intended to be mounted in the screen frame of a screening machine.

I claim:

1. A plurality of screen cloth elements mounted in a screen frame of a screening machine, said screen cloth elements being arranged one after another overlapping in a roof-tile manner, each screen cloth element having a rigid mounting frame and a screen cloth which is retained thereby, said screen cloth having a rigid screen cloth frame and being designed as a separate element from the rigid mounting frame, said rigid mounting frame of said screen cloth element having a guide device laterally open relative to said screen cloth element and designed for sliding engagement with said screen cloth during insertion thereof in said guide device and further designed to prevent relative movements between said screen cloth and said rigid mounting frame of said screen cloth element in directions making an angle with a plane of said screen cloth, wherein guide surfaces of said guide device are so positioned in said screen cloth element as to be protected against contact with material placed on the screen cloth element during use, wherein said guide surfaces of successive screen cloth elements are protected by said screen cloth.

2. A screen cloth element as claimed in claim 1, wherein said rigid screen cloth frame is at least partially surrounded by elastomeric material.

3. A screen cloth element as claimed in claim 1, in which said rigid mounting frame of said screen cloth element comprises a rigid frame core and a coating of abrasion-resistant elastomeric material at least partially surrounding said rigid frame core, wherein said guide device is formed in said coating.

4. A screen cloth element as claimed in claim 1, wherein a portion of said screen cloth covers guide surfaces of said guide device, said portion being made from an abrasion-resistant elastomeric material.

5. A screen cloth element as claimed in claim 4, wherein said portion of said screen cloth that covers said guide surfaces is made from wear-resistant rubber.

6. A screen cloth element as claimed in claim 1, wherein parts of said rigid screen cloth frame of said screen cloth are located in the screen cloth adjacent said guide device.

7. A screen cloth element as claimed in claim 1, wherein said rigid mounting frame includes a mounting core.

8. A screen cloth element as claimed in claim 3, wherein undercut recesses are formed in said coating partially surrounding the rigid frame core for receiving ends of carrier rods included in a separate wire screen, and for retaining the wire screen in the screen cloth element.

9. A screen cloth element as claimed in claim 1, wherein said rigid mounting frame an upstream end guide device defined by a first and second side all forming an elongated groove, wherein the first side wall is configured to extend from the second wall toward a material receiving surface of the screen cloth element at an acute angle with respect to said material receiving surface and a downstream end of the screen cloth element.

10. A screen cloth element as claimed in claim 9, wherein said first side wall terminates at the material receiving surface and said second side wall terminates at a support surface, and wherein said groove has an apex positioned at a greater distance from the material receiving surface than from the support surface.

11. A screen cloth element as claimed in claim 9, wherein said rigid mounting frame further includes a downstream end guide including a flange having a substantially triangular cross-section and directed towards an upstream end of the rigid mounting frame.

12. A screen cloth element as claimed in claim 11, wherein the rigid mounting frame includes the material receiving surface and the support surface, and further wherein said flange has a free end disposed closer to the material receiving surface than to the support surface.

13. A screen cloth element as claimed in claim 12, wherein said screen cloth has a downstream end guide body formed by upper and lower wall surfaces which form a groove in a downstream end surface of the screen cloth, wherein the lower wall extends from the upper wall in an angular fashion, away from a material receiving face of the screen cloth.

14. A screen cloth element as claimed in claim 13, wherein said screen cloth has a projecting flange portion for covering and protecting said downstream end guide of said rigid mounting frame.

15. A plurality of screen cloth elements mounted in a screen frame of a screening machine, said screen cloth elements being arranged one after another overlapping in a roof-tile manner, each screen cloth element having a rigid mounting frame and a screen cloth which is retained thereby, wherein the screen cloth element is configured to be fixed in a screen frame of a screening machine, said screen cloth having a rigid screen cloth frame and being designed as a separate element from the rigid mounting frame, said rigid mounting frame of said screen cloth element having a guide device laterally open relative to said screen cloth element and designed for sliding engagement with said screen cloth during insertion thereof in said guide device and further designed to prevent relative movements between said screen cloth and said rigid mounting frame of said screen cloth element in directions making an angle with a plane of said screen cloth, wherein guide surfaces of said guide device are so positioned in said screen cloth element as to be protected against contact with material placed on the screen cloth element during use, the screen cloth element configured to be mounted in such a manner in the screen frame of the screening machine that ends of screen cloth elements mounted after one another are overlapping in roof-tile manner, wherein said guide surfaces of successive screen cloth elements are protected by an overlapping portion of an adjoining screen cloth element covering the guide surfaces.

16. A plurality of screen cloth elements mounted in a screen frame of a screening machine, said screen cloth elements being arranged one after another overlapping in a roof-tile manner, each screen cloth element having a rigid mounting frame and a screen cloth which is retained thereby, wherein the screen cloth element is configured to be fixed in a screen frame of a screening machine, said screen cloth having a rigid screen cloth frame and being designed as a separate element from the rigid mounting frame, said rigid mounting frame of said screen cloth element having a guide device laterally open relative to said screen cloth element and designed for sliding engagement with said screen cloth during insertion thereof in said guide device and further designed to prevent relative movements between said screen cloth and said rigid mounting frame of said screen cloth element in directions making an angle with a plane of said screen cloth, wherein guide surfaces of said guide device are so positioned in said screen cloth element as to be protected against contact with material placed on the screen cloth element during use, the screen cloth element configured to be mounted in such a manner in the screen frame of the screening machine that ends of screen cloth elements mounted after one another are overlapping in roof-tile manner, wherein said guide surfaces of successive screen cloth elements are protected by said screen cloth covering said guide surfaces and by an overlapping portion of an adjoining screen cloth element covering the guide surfaces.

* * * * *

UNITED STATES PATENT AND TRADEMARK OFFICE
CERTIFICATE OF CORRECTION

PATENT NO. : 5,735,409  Page 1 of 3
DATED : APRIL 7, 1998
INVENTOR(S) : MATS ANDERS MALMBEG It is certified that error appears in the above-identified patent and that said Letters Patent is hereby corrected as shown below:

Col. 8, line 31, delete "A screen cloth element" insert
--Screen cloth elements--

Col. 8, line 34, delete "A screen cloth element", insert--Screen cloth elements--

Col. 8, line 40, delete "A screen cloth element", insert--Screen cloth elements--

Col. 8, line 44, delete "A screen cloth element", insert--Screen cloth elements--

Col. 8, line 47, delete "A screen cloth element", insert--Screen cloth elements--

Col. 8, line 50, delete "A screen cloth element", insert--Screen cloth elements--

Col. 8, line 52, delete "A screen cloth element", insert--Screen cloth elements--

Col. 8, line 57, delete "A screen cloth element", insert--Screen cloth elements--

Col. 8, line 65, delete "A screen cloth element", insert--Screen cloth elements--

UNITED STATES PATENT AND TRADEMARK OFFICE
CERTIFICATE OF CORRECTION

PATENT NO. : 5,735,409
DATED : APRIL 7, 1998
INVENTOR(S) : MATS ANDERS MALMBEG

It is certified that error appears in the above-identified patent and that said Letters Patent is hereby corrected as shown below:

Col. 9, line 4, delete "A screen cloth element", insert

--Screen cloth elements--

Col. 9, line 9, delete "A screen cloth element", insert

--Screen cloth elements--

Col. 9, line 14, delete "A screen cloth element", insert

--Screen cloth elements--

Col. 9, line 21, delete "A screen cloth element", insert

--Screen cloth elements--

Col. 9, lines 30-31, delete "wherein the screen cloth element is configured to be fixed in a screen frame of a screening machine"

Col. 10, lines 4-8, delete "the screen cloth element configured to be mounted in such a manner in the screen frame of the screening machine that ends of screen cloth elements mounted after one another are overlapping in roof-tile manner"

Col. 10, lines 17-18, delete "wherein the screen cloth element is configured to be fixed in a screen frame of a screening machine,"

UNITED STATES PATENT AND TRADEMARK OFFICE
CERTIFICATE OF CORRECTION

PATENT NO. : 5,735,409
DATED : APRIL 7, 1998
INVENTOR(S) : MATS ANDERS MALMBEG

It is certified that error appears in the above-identified patent and that said Letters Patent is hereby corrected as shown below:

Col. 10, lines 30-34, delete "the screen cloth element configured to be mounted in such a manner in the screen frame of the screening machine that ends of screen cloth elements mounted after one another are overlapping in roof-tile manner"

Signed and Sealed this

Fifth Day of January, 1999

Attest:

Attesting Officer

*Acting Commissioner of Patents and Trademarks*